US005816657A

United States Patent [19]
Hecht et al.

[11] Patent Number: 5,816,657

[45] Date of Patent: Oct. 6, 1998

[54] VEHICLE SEAT HEADREST ASSEMBLY

[75] Inventors: Robert L. Hecht; Donald A. Lux, both of Trollhättan, Sweden

[73] Assignee: Lear Corporation, Southfield, Mich.

[21] Appl. No.: 920,753

[22] Filed: Aug. 29, 1997

[51] Int. Cl.[6] .......... B60N 2/48

[52] U.S. Cl. .......... 297/391; 297/403; 297/220

[58] Field of Search .......... 297/220, 391, 297/397, 408, 403

[56] References Cited

U.S. PATENT DOCUMENTS

| | | | |
|---|---|---|---|
| 3,304,120 | 2/1967 | Cromer | 297/397 X |
| 4,114,948 | 9/1978 | Perkey . | |
| 4,165,125 | 8/1979 | Owen | 297/397 X |
| 4,482,186 | 11/1984 | Gomes | 297/403 X |
| 4,773,707 | 9/1988 | Vadala | 297/391 |
| 5,015,036 | 5/1991 | Fergie . | |
| 5,135,283 | 8/1992 | Cassese et al. . | |
| 5,154,477 | 10/1992 | Lacy . | |
| 5,211,696 | 5/1993 | Lacy . | |
| 5,240,330 | 8/1993 | Thompson . | |
| 5,501,508 | 3/1996 | Llewellyn . | |
| 5,538,323 | 7/1996 | Henkel . | |

*Primary Examiner*—Peter R. Brown
*Attorney, Agent, or Firm*—Brooks & Kushman P.C.

[57] ABSTRACT

A vehicle seat headrest assembly includes a substantially U-shaped support member having first and second ends and a middle portion between the first and second ends. A headrest pouch is attached to the middle portion and pivotable about the middle portion for selective attachment to one of the first and second ends for head support adjustment. The headrest pouch includes a pocket formed therein for receiving a pillow. Preferably, a reversible attachment member is secured to a distal end of the headrest pouch for attaching the headrest pouch to the selected end of the support member.

14 Claims, 1 Drawing Sheet

24 28 26 16 20 10 18 14

VEHICLE SEAT HEADREST ASSEMBLY

TECHNICAL FIELD

The present invention relates to a vehicle seat headrest assembly, and more particularly to a headrest pouch attached to a vehicle headrest and pivotable over the headrest for head support adjustment.

BACKGROUND OF THE INVENTION

Typically, vehicle seat headrests are intended to provide head support to a vehicle occupant for both safety and comfort. It is desirable to further provide adjustability of head support and comfort features for different drivers and different operating conditions. Such adjustability may be provided by a four-way mechanical or power adjustable head restraint system. However, known prior art four-way adjustable systems are complex and expensive to manufacture.

U.S. Pat. Nos. 5,501,508 and 5,538,323 disclose relatively inexpensive apparatus for head support adjustment. The '508 patent provides a number of adjustment pillows attached to the headrest for placement at various positions by the user for comfort and support adjustment. The '323 patent describes the use of a single pillow attached to the top of a headrest and pivotable over the top of the headrest for head support adjustment. The primary problem with these designs is that they are not aesthetically pleasing, end do not provide easy and comfortable adjustability for different drivers. Accordingly, these designs are not feasible for use in a production vehicle.

Therefore, it is desirable to provide a vehicle seat headrest assembly which includes adjustable support and comfort features in a manner which is aesthetically pleasing and functionally effective.

Disclosure Of The Invention

The present invention provides a vehicle seat headrest assembly including a headrest pouch pivotally connected to a U-shaped support member, wherein the headrest pouch is adapted to support a pillow therein, and the headrest pouch includes a reversible attachment member secured to a distal end of the headrest pouch for attachment to a selected end of the U-shaped support member.

More specifically, the present invention provides a vehicle seat headrest assembly, including a substantially U-shaped support member having first and second ends and a middle portion between the first and second ends. A headrest pouch is attached to the middle portion and pivotable about the middle portion for selective attachment to one of the first and second ends for head support adjustment. The headrest pouch includes a pocket formed therein. A pillow is received within the pocket. A reversible attachment member is secured to a distal end of the headrest pouch for attaching the headrest pouch to the selected end of the support member.

Accordingly, an object of the present invention is to provide a vehicle seat headrest assembly with adjustable head support, and which does not include unattached support portions which are free to move with respect to the headrest, as in U.S. Pat. Nos. 5,501,508 and 5,538,323.

Another object of the present invention is to provide a headrest assembly which includes a substantially U-shaped support member and a headrest pouch attached to the support member and pivotable about the support member for selected attachment to the opposing ends of the support member for head support adjustment.

A further object of the present invention is to provide a vehicle support headrest assembly with an adjustable headrest pouch including a reversible attachment member attachable to a selected end of the support member of the headrest.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
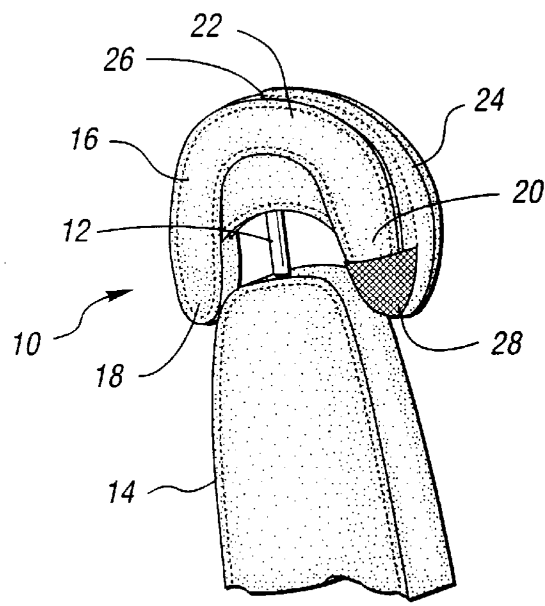
FIG. 1 shows a side perspective view of a vehicle headrest assembly with a headrest pouch in the forward position in accordance with the present invention.
Figure 2:
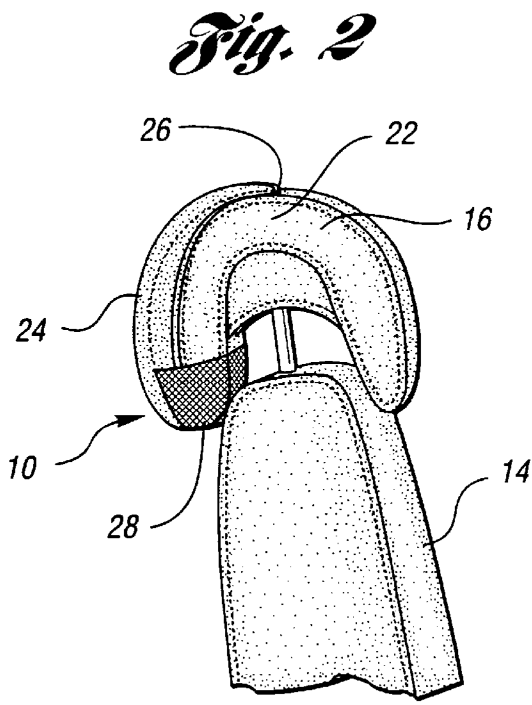
FIG. 2 shows a side perspective view of the vehicle headrest assembly of FIG. 1 with the headrest pouch in the rearward position.
Figure 3:
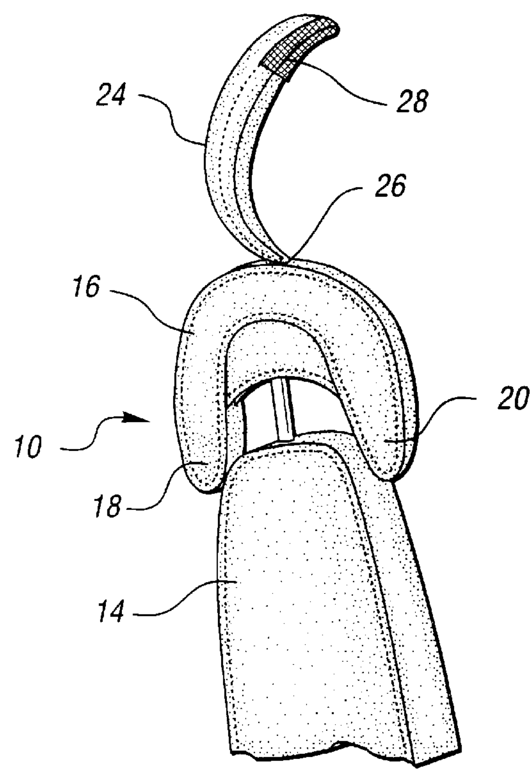
FIG. 3 shows a side perspective view of the vehicle headrest assembly of FIG. 1 with the headrest pouch unattached to a forward or rearward portion of the headrest.

Referring to FIGS. 1–3, a vehicle seat headrest assembly 10 is shown in accordance with a preferred embodiment of the invention. As shown, the vehicle seat headrest assembly 10 is shown supported on a headrest support bar 12, which is positioned on top of a vehicle seat back 14.

The vehicle seat headrest assembly 10 includes a substantially U-shaped support member 16 supported on the headrest support bar 12. The substantially U-shaped support member 16 includes first and second ends 18,20, and a middle portion 22 between the first and second ends 18,20. A headrest pouch 24 is sewn to the middle portion 22 of the substantially U-shaped support member 16 at the sew joint 26. The headrest pouch 24 is pivotable about the middle portion 22 for selective attachment to one of the first and second ends 18,20 for head support adjustment. The headrest pouch 24 includes a pocket formed therein for receiving a pillow, such as described below with reference to FIG. 4.

The headrest pouch 24 is provided with a reversible attachment member secured to the distal end of the headrest pouch 24 for attaching the headrest pouch to the selected end of the support member 16. The reversible attachment member preferably comprises an elastic strap 28 which may be pulled over the selected end 18,20 of the substantially U-shaped support member 16. The elastic strap 28 could also include a Velcro strip for securing the elastic strap 28 to the respective end 18,20 of the support member 16.

Figure 4:
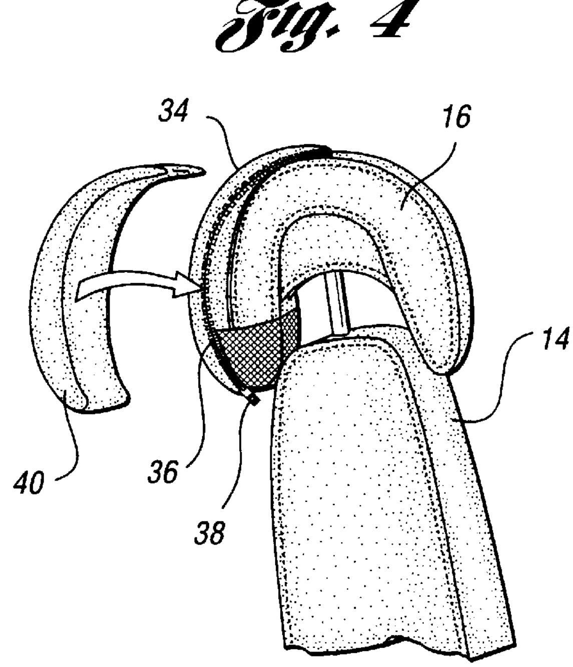
FIG. 4 shows a schematically arranged, partially exploded side perspective view of a vehicle seat headrest assembly in accordance with an alternative embodiment of the present invention.

In an alternative embodiment, as shown in FIG. 4, the headrest pouch 34 includes a side aperture 36 which comprises a zippered opening by means of the zipper 38. Of course, the opening 36 could comprise a Velcro attachment strip for providing access to the interior pocket. Accordingly, the side aperture 36 may be opened for insertion of variously sized and shaped cushions, such as cushion 40, for adjusting head support and cushion softness. The cushion 40 could be an energy absorbing foam pad, and could comprise various densities for differing comfort levels. The side opening 36 is preferably configured for easy removal and replacement of the cushion 40 for adjustment between drivers.

Alternatively, specific memory-type comfort foams could be used for the cushion 40.

Therefore, by establishing the proper distance from the back of an occupant's head to the head restraint by inserting the appropriate headrest cushion or pillow with the proper thickness and firmness into the pocket, the flip-over headrest pouch is selectively adjustable for each occupant's needs. Furthermore, this simple adjustability is provided in an inexpensive manner with an aesthetically appealing design.

While the best modes for carrying out the invention have been described in detail, those familiar with the art to which this invention relates will recognize various alternative designs and embodiments for practicing the invention within the scope of the appended claims.

What is claimed is:

1. A vehicle seat headrest assembly, comprising:

a substantially U-shaped support member having first and second ends and a middle portion between the first and second ends;

a headrest pouch attached to the middle portion and pivotable about the middle portion said headrest pouch includes an attachment member for selective attachment to one of the first and second ends for head support adjustment, the headrest pouch having a pocket formed therein; and a pillow received within the pocket.

2. The vehicle seat headrest assembly of claim 1, wherein said attachment member comprises a reversible attachment member secured to a distal end of the headrest pouch for attaching the headrest pouch to the selected end of the support member.

3. The vehicle seat headrest assembly of claim 2, wherein said reversible attachment member comprises an elastic strap.

4. The vehicle seat headrest assembly of claim 1, wherein said headrest pouch comprises a side aperture for pillow replacement.

5. The vehicle seat headrest assembly of claim 4, wherein said side aperture comprises a zippered opening.

6. The vehicle seat headrest assembly of claim 1, wherein the headrest pouch is sewn to the middle portion of the support member.

7. A vehicle seat headrest assembly, comprising:

a substantially U-shaped support member having first and second ends and a middle portion between the first and second ends;

a headrest pouch attached to the middle portion and pivotable about the middle portion for selective attachment to one of the first and second ends for head support adjustment, the headrest pouch having a pocket formed therein;

a pillow received within the pocket; and a reversible attachment member secured to a distal end of the headrest pouch for attaching the headrest pouch to the selected end of the support member.

8. The vehicle seat headrest assembly of claim 7, wherein said reversible attachment member comprises an elastic strap.

9. The vehicle seat headrest assembly of claim 7, wherein said headrest pouch comprises a side aperture for pillow replacement.

10. The vehicle seat headrest assembly of claim 9, wherein said side aperture comprises a zippered opening.

11. The vehicle seat headrest assembly of claim 7, wherein the headrest pouch is sewn to the middle portion of the support member.

12. A vehicle seat headrest assembly, comprising:

a substantially U-shaped support member having first and second ends and a middle portion between the first and second ends;

a headrest pouch attached to the middle portion and pivotable about the middle portion for selective attachment to one of the first and second ends for head support adjustment, the headrest pouch having a pocket formed therein;

a pillow received within the pocket;

a reversible elastic strap secured to a distal end of the headrest pouch for attaching the headrest pouch to the selected end of the support member.

13. The vehicle seat headrest assembly of claim 12, wherein said headrest pouch comprises a side aperture for pillow replacement.

14. The vehicle seat headrest assembly of claim 13, wherein said side aperture comprises a zippered opening.

* * * * *